June 6, 1939.                C. B. KAMISS                2,161,058
                             X-RAY CASSETTE
                        Filed Feb. 25, 1939            2 Sheets—Sheet 1
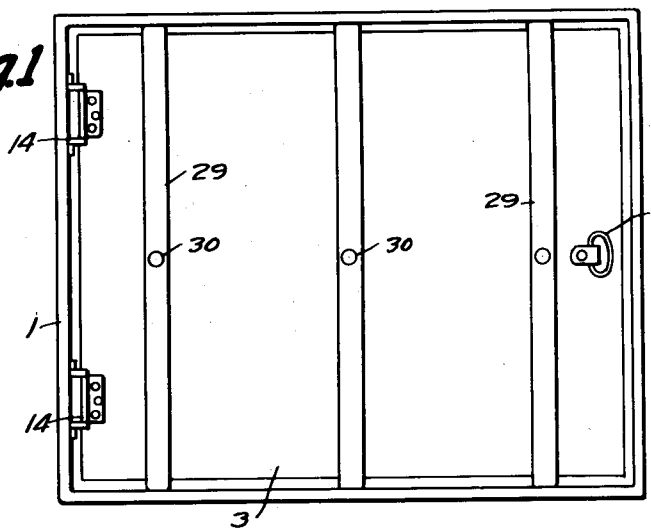
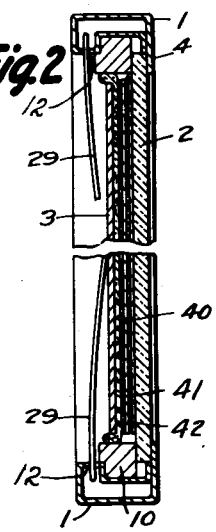
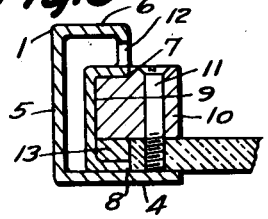
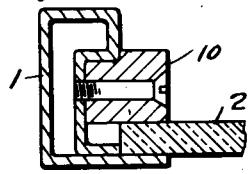
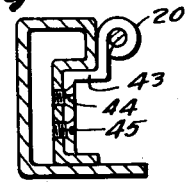
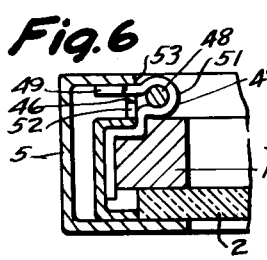
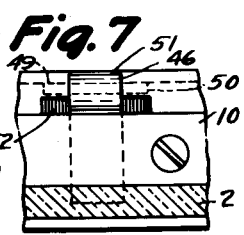
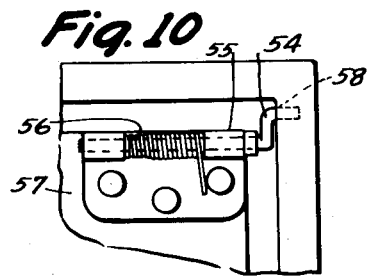
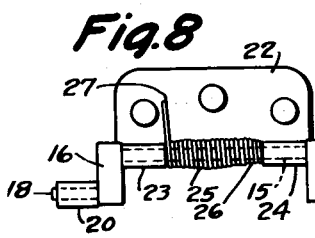
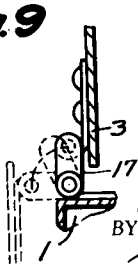
INVENTOR.
Charles B. Kamiss
BY James Harrison Bowen
                ATTORNEY.

June 6, 1939.  C. B. KAMISS  2,161,058
X-RAY CASSETTE
Filed Feb. 25, 1939  2 Sheets-Sheet 2
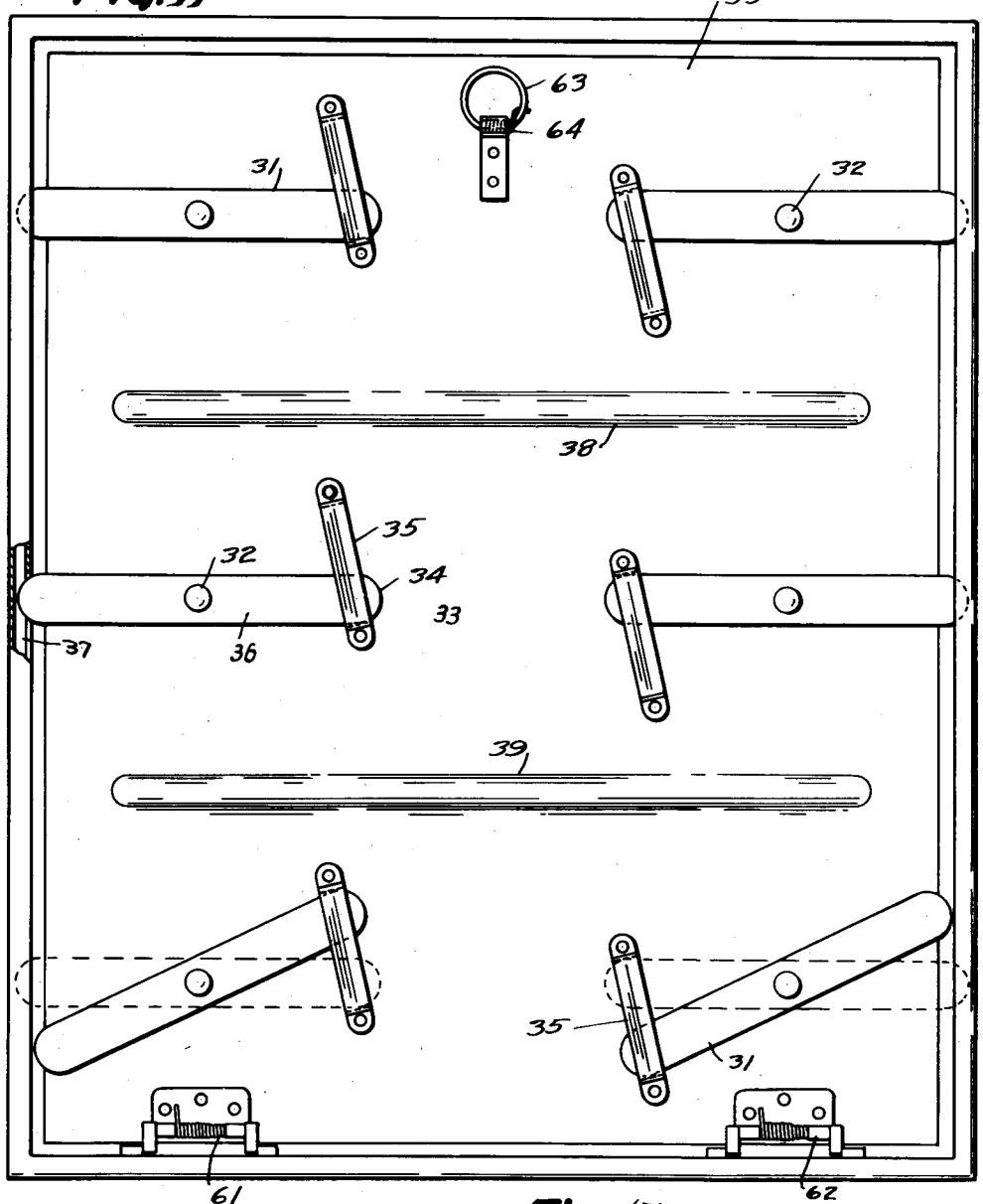
INVENTOR.
Charles B. Kamiss
BY James Harrison Bower
ATTORNEY.

Patented June 6, 1939

2,161,058

UNITED STATES PATENT OFFICE 2,161,058

X-RAY CASSETTE

Charles B. Kamiss, Flushing, N. Y.

Application February 25, 1939, Serial No. 258,445

5 Claims. (Cl. 250—68)

The purpose of this invention is to provide improvements in cassettes for X-ray use, in which the composite sheet, usually a plate of Bakelite or the like is held on a flange of a continuous recess in the frame by a bar or key, the back hinged to the frame so that it will open without sliding one intensifying screen upon another, and the spring load holding the back in the frame distributed over the frame.

The invention is a cassette comprising a rectangular shaped frame having a continuous recess around the inner surface, in which a sheet of Bakelite or the like is held by a continuous key, and the back is hinged to the frame by double jointed hinges with springs adapted to raise the edge of the back when the back is released, and the back is clamped in the frame by a plurality of clamping devices distributed at different points thereon.

X-ray cassettes have been used for some time, and these have been made in the form of a frame substantially the same as frames used for printing plates, blue prints, and the like, except that the back is hinged to the frame, and Bakelite or a sheet of similar material is used instead of the glass, and a lead plate and intensifying screens are used between the back and sheet of Bakelite. The most common of these frames is made with the sheet of Bakelite or other material secured in a continuous groove, and, with the Bakelite mounted in this manner, it is very difficult to remove and replace. It has been found desirable, therefore, to provide a continuous recess with Bakelite held against a flange extending at the edge of the recess by a strip of material forming a key removably mounted in the same recess with the edge of the Bakelite, and permanently secured in place, and, as any type of hinge now in use causes a slight degree of sliding between the two intensifying screens, it has been found desirable to provide a spring for instantly elevating the back as soon as the back is released, and also, as Bakelite is very resilient so that it bows outward forming a concave surface when holding the sensitive plate with the pressure of the springs applied at the center, it has been found desirable to use a plurality of holding springs and pivotally mount these springs at a plurality of points over the back, so that the load is removed from the center and distributed over the entire surface, and, particularly at points adjacent the edges.

It is also necessary to use markers in cassettes, and lead letters in pads are inserted under the intensifying screens, however, these cause a slight bulge and are, therefore, objectionable, whereas, by engraving the letters in the Bakelite or other plate, and filling the latters with material opaque to X-ray, it is possible to mark the plates without a bulge and with a smooth surface.

The object of this invention is, therefore, to provide an improved cassette in which the sheet of material forming the face may readily be removed and replaced.

Another object is to provide a cassette in which means is provided for instantly raising the back as soon as it is released.

Another object is to provide means for resiliently urging the back toward the plate at a plurality of points.

Another object is to provide means for reinforcing the back to prevent bending in the central part thereof.

A further object is to provide means for marking X-ray plates without causing a raised portion in the intensifying screens between which the plates are held.

And a still further object is to provide an improved cassette which is of a simple and economical construction.

With these ends in view the invention embodies a rectangular shaped frame with the sides made of a strip of metal formed to provide a relatively wide, continuous recess around the inner surface, with the edges of the material forming the sides of the frame permanently held together, a key holding the edge of the Bakelite in the recess, a back hingedly attached to the frame, and adapted to be used with intensifying screens, a lead plate, and a backing of resilient material such as felt, double hinges in the form of crankshafts, springs adapted to hold the outer parts of the hinges upward, clamping means distributed over the back, and marking letters inserted in the Bakelite plate or the like.

Other features and advantages of the invention will appear from the following description taken in connection with the drawings, wherein:

Figure 1 is a view showing a plan view of the frame looking toward the back.

Figure 2 is a cross section through the frame, with the side members enlarged and the parts broken away.

Figure 3 is a detail showing a cross section through one side of the frame with the key secured to the plate.

Figure 4 is a similar view showing the key secured to the frame instead of the plate.

Figure 5 is a detail showing a method of mounting the hinge in the frame.

Figure 6 is a detail showing an alternate type of hinge.

Figure 7 is a view looking toward the front of the hinge shown in Figure 6.

Figure 8 is a plan view of the hinge used in Figures 1 and 11.

Figure 9 shows an end view of the hinge with a portion of the frame and cover.

Figure 10 is a view showing an alternate type of hinge.

Figure 11 is a view similar to that shown in Figure 1, showing an alternate design in which a plurality of spring holding devices are provided on the back of the plate.

Figure 12 is a detail showing one of the clips for holding the springs shown in Figure 11.

Figure 13 is a detail showing one of the springs in the holding position.

Figure 14 is a cross section through the clip shown in Figure 12.

Figure 15 is a section through a part of the cover plate of the cover shown in Figure 11 illustrating reinforcing ridges therein.

The respective parts may be made of metal or any material suitable for X-ray frames, however, it is preferred to make the frame of stainless steel, the back of aluminum, and the plate of Bakelite.

In the drawings the cassette is shown as it may be made, wherein numeral 1 indicates the frame, numeral 2, the composition sheet which is usually Bakelite, and numeral 3, the back.

The frame 1 is formed of a strip of material with a part 4 forming the front plate of the frame, an upwardly extending part 5 forming a side of the frame, and a part 6 which bends over forming the back, and, from the end of the part 6, the strip is bent downward, then inward at the point 7, then downward until it engages the plate 4, and then outward to the point 8 which engages the edge of the plate 2. This forms a continuous recess 9 around the inner surface of the frame, and the plate 2 is placed upon the flange or extension of the plate 4, with the edge of the Bakelite engaging the end at the point 8. The plate 2 is held in place by a key 10 also extending continuously around the frame, and the key may be attached to the plate 2 by screws 11 as shown which may hold the key to the plate as shown in Figure 3, or to the frame as shown in Figure 4. The upper edge of the key 10 is provided with a groove to accommodate the corner of the frame at the point 7, permitting the upper surface of the key 10 to correspond with the lower edge of slots 12 in the sides of the frame into which the ends of the spring clamping members may extend.

It will be noted, therefore, that the sides or parts of the frame are formed of a continuous strip of material bent to form a hollow bar with a recess in the inner surface, and the inner edge of the strip, as shown at the point 8, is welded to the plate 4 continuously around the frame, providing a rigid construction. The small area in the recess 9 at the edge of the plate 2 may remain open or may be filled with wire or the like, as indicated by the numeral 13. The cover 3 is hinged to the end of the frame as shown in Figures 8 and 9 by members 14 having outer pins 15, side members 16 and 17, and pins 18 and 19, with the pins 18 and 19 held in bearings 20 and 21 on the frame, and the pins 15 held in bearings 22 on the back through the parts 23 and 24, with springs 25 on the pins, and positioned between the parts 23 and 24. The springs are secured in place by binding one end 26 to the pins 15, with the opposite ends 27 extending outward on the bearings 22, and, with the springs and parts arranged in this manner, the springs will have a tendency to elevate the parts 22, and, therefore, as soon as the back 33 is released, the springs will raise the edge of the back so that, as the opposite end is moved upward by a ring or handle 28 thereon, both ends will rise, and, therefore, any sliding motion between the rear edges of the intensifying screens under the hinge will be eliminated.

The back 3, in Figure 1, is shown with the usual type of spring clamping fingers 29 pivoted at the points 30, and with the ends adapted to slide into notches 12 positioned at opposite points in the sides of the frame. However, it will be understood that these spring fingers may also be made as shown in Figure 11, in which a plurality of spring members 31 are provided which are pivotally mounted on pins 32, on the back 33, with their inner ends 34 held down by clips 35, the engaging surfaces 36 of which are V-shaped, as shown in Figure 14, and these form a counter-balance for the springs, with the other ends held in notches 37 in the frame corresponding to the notches 12.

It will be understood that, although six of these spring members are illustrated, any number may be provided. The back in this design is also provided with ridges 38 and 39, as shown in detail in Figure 15, which extend substantially across the back between the spring members, reinforcing the back and preventing bending in the center. In use the back is formed with a relatively thick pad of felt or the like 40, with a lead plate 41 on the face, and this may be covered by a thin sheet preferably of black paper, indicated by the numeral 42. The lead plate may be incorporated in the pad 40, however, it is preferred to use it on the face thereof, as illustrated in Figure 2.

Although it is understood that any suitable type of hinge may be used, it is desired to use the specific hinge illustrated in Figures 8 and 9, and mounted as shown in Figure 5, in which the bearings 20 and 21 are attached to the frame by extending flanges 43 thereof downward and inward, with the flanges secured in the recess of the frame by screws 44 and 45. This hinge may also be mounted without screws by inserting the bearings 46 in recesses 46, as illustrated in Figures 6 and 7, with the bearings held upward in the upper portions of the slot by the key 10. In this design, the bearings 47 are formed around pins 48 corresponding to the pins 18 and 19, with the upper parts of the plates provided with extending wings 49 and 50 shown in dotted lines in Figure 7, and with the lower part of the bearing 51 positioned inside of the frame. In mounting this bearing the wings are placed through the slot 46 in the downward position, in which the wings 49 and 50 will pass through the wide portion 52 of the slot, and, when the bearings are moved upward, the wings 49 and 50 are located behind the front plate 53 of the frame, preventing the bearing moving outward, and, with the bearing held upward by the key 10, it will be secured in position.

The hinges may also be provided as illustrated in Figure 10, in which offset pins 54 are mounted in bearings 55, with springs 56 similar to the springs 25, and, with the bearings mounted on the back 57 and the pins 54 in openings 58, the spring will raise this edge of the back as soon as the back is released by the clamping means.

The plate 33 shown in Figure 11 is also hinged to the frame by hinges 61 and 62 similar to the hinges shown in Figures 8 and 9, and the opposite end may be provided with a lifting ring 63 resiliently held by a spring 64.

It will be understood that other changes may be made without departing from the spirit of the invention. One of which changes may be in the size or general design of the frame, another may be in the use of other means for removably holding the Bakelite or other plate in the frame, another may be in the use of a back of any other type or description, and still another may be in the use of other means for resiliently holding the back with the intensifying screens and sensitive plate in position.

The construction will be readily understood from the foregoing description. In use the device may be provided as shown and described, and it will be noted that although the plate 2 is shown and described as being formed with Bakelite, any composition sheet or plate may be used, and this may be of any thickness or of any material adapted for X-ray use, and, with the plate held in the frame in this manner, it may be readily removed and replaced by removing the screws 11, and, at the same time, it is positively held in position. In use the sensitive plate is placed on the intensifying screen upon the plate 2, then another intensifying plate, and then the back is clamped against the second intensifying screen, rigidly holding the sensitive plate between the screens, and, with the parts held in this manner, the X-ray may be taken and the sensitive plate removed. It will be noted that the spring members 31 eliminate the objection caused by bending the plate when the pressure is applied at the center, with the design shown in Figure 1, so that the surface of the plate is relatively flat, thereby making it possible to obtain a more perfect picture.

Having thus fully described the invention, what I claim as new, and desire to secure by Letters Patent, is:

1. An X-ray cassette comprising a frame substantially of a rectangular shape, having a continuous recess around the inner surface, a composition sheet of material forming a plate resting upon a flange extending from the frame at one side of the recess, a key extending continuously around the inner surface of the frame fitting into the recess and resting upon the plate, locking the plate in place, a back hinged to the frame, and means resiliently urging the back toward the plate.

2. A device, as described in claim 1, in which the key is secured to the plate.

3. A device, as described in claim 1, in which the key is held in place by screws.

4. A device, as described in claim 1, in which the key is provided with a groove receiving the upper edge of the frame forming a side of the continuous recess therein.

5. An X-ray cassette comprising a frame substantially of a rectangular shape having a composite sheet forming a plate removably mounted in said frame, and a removable back hinged to the frame at one end, and resiliently urged toward the plate at a plurality of points by spring clips; characterized in that the plate is secured in the frame by a key in a slot of the frame, also by double-jointed hinges normally positioned below the level of the back of the frame, the back being movable through an angle of substantially 180°, said hinges resiliently urging the adjacent edge of said back away from the plate separating the back from the plate when the back is released by the spring clips, said cassette further characterized in that the spring clips are formed of bars pivotally attached to the back, with the ends separated from the back and with one end free and movable for sliding into slots of the frame while the other end is held downward by brackets on the back, said back having ridges, reinforcing the same, and also having a ring forming a handle, with means resiliently holding said ring against the back.

CHARLES B. KAMISS.